United States Patent
Neuner, III et al.

(10) Patent No.: US 9,735,891 B1
(45) Date of Patent: Aug. 15, 2017

(54) WAVELENGTH OPTIMIZATION FOR FREE-SPACE OPTICAL COMMUNICATIONS

(71) Applicant: The United States of America as represented by the Secretary of the Navy, Washington, DC (US)

(72) Inventors: Burton H. Neuner, III, San Diego, CA (US); Ryan P. Lu, San Diego, CA (US); Ayax D. Ramirez, Chula Vista, CA (US); Michael G. Lovern, Chula Vista, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 14/870,480

(22) Filed: Sep. 30, 2015

Related U.S. Application Data

(60) Provisional application No. 62/198,223, filed on Jul. 29, 2015.

(51) Int. Cl.
  *H04B 10/00* (2013.01)
  *H04B 10/80* (2013.01)
  *H04B 10/572* (2013.01)

(52) U.S. Cl.
  CPC ........... *H04B 10/80* (2013.01); *H04B 10/572* (2013.01)

(58) Field of Classification Search
  CPC .............................. H04B 10/80; H04B 10/572
  See application file for complete search history.

(56) References Cited

U.S. PATENT DOCUMENTS

| | | | | |
|---|---|---|---|---|
| 7,068,362 | B2* | 6/2006 | Murdock | G01N 21/538 356/218 |
| 8,218,924 | B1* | 7/2012 | Schantz | G02B 6/02057 385/100 |
| 8,750,727 | B1* | 6/2014 | Hiller | H04B 13/02 398/118 |
| 9,031,413 | B2* | 5/2015 | Doniec | H04B 13/02 398/104 |
| 2007/0075225 | A1* | 4/2007 | Xia | G01N 21/7703 250/227.14 |
| 2008/0205892 | A1* | 8/2008 | Baiden | H04B 13/02 398/104 |
| 2012/0050520 | A1* | 3/2012 | Thoren | G02B 23/22 348/81 |

(Continued)

OTHER PUBLICATIONS

Gedero, T., "Underwater robot tests in Hammerfest," 2013, ,http://www.eninorge.com/en/News--Media/News-Archive/2013/Testet-ny-undervannsrobot-i-Hammerfest/>.

(Continued)

*Primary Examiner* — Danny Leung
(74) *Attorney, Agent, or Firm* — SPAWAR Systems Center Pacific; Kyle Eppele; Ryan J. Friedl

(57) ABSTRACT

A system and method involve propagating, from one or more optical sources connected to a platform, more than one optical signal through a surrounding medium towards a reflective surface. Reflected optical signals, representing the propagated optical signals reflected off of the reflective surface, are then detected using a detection system coupled to the platform. An ideal optical wavelength is then selected for optical communication from the platform within the surrounding medium based upon one or more characteristics of the detected reflected optical signals.

18 Claims, 8 Drawing Sheets

(56) References Cited

U.S. PATENT DOCUMENTS

| | | | | |
|---|---|---|---|---|
| 2014/0196745 A1* | 7/2014 | Whelan | ............... | B63B 59/04 |
| | | | | 134/1 |
| 2014/0341584 A1* | 11/2014 | Hopewell | ............. | H04B 10/80 |
| | | | | 398/104 |
| 2015/0219765 A1* | 8/2015 | Mead | ............... | H01S 3/06754 |
| | | | | 356/5.09 |
| 2016/0137276 A1* | 5/2016 | Salters | ............... | B08B 17/02 |
| | | | | 114/222 |

OTHER PUBLICATIONS

Hansen, F., et al., "High bandwidth underwater optical communication," Applied Optics, vol. 47, No. 2, pp. 277-283, 2008.

Mullen, L., et al., "Backscatter suppression for underwater modulating retroreflector links using polarization discrimination," Applied Optics, vol. 48, No. 2, pp. 328-337, 2009.

Poirier, P. et al., "Undersea laser communication using polarization and wavelength modulation," Applied Optics, vol. 53, No. 11, pp. 2283-2289, 2014.

Cochenour, B., et al., "Effect of scattering albedo on attenuation and polarization of light underwater," Opt. Lett. 35, 2088, 2010.

Bohren, C.F., et al., "Absorption and Scattering of Light by Small Particles," Wiley Interscience, New York, pp. 79-81, 1998.

He, G.S., et al., "Rayleigh, Mie, and Tyndall scatterings of polystyrene microspheres in water: wavelength, size, and angle dependencies," J. Appl. Phys., 105, 023110, 2009.

Cerussi, A., "Diffuse optical spectroscopic imaging (DOSI)," 2014, ,https://sites.google.com/site/dosiatbli/what-is-dosi-/absorption-spectra>.

\* cited by examiner

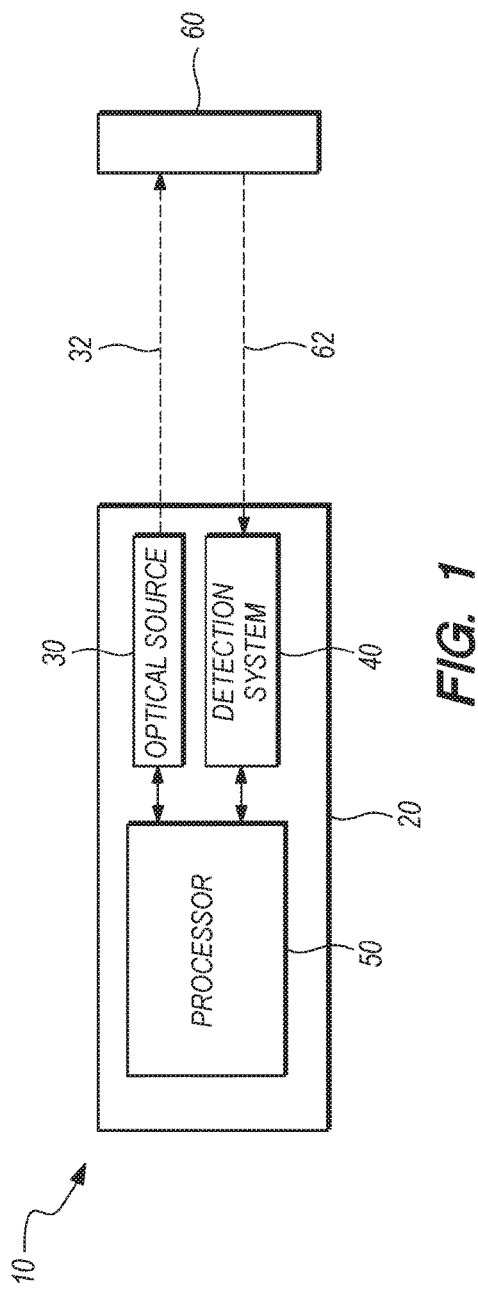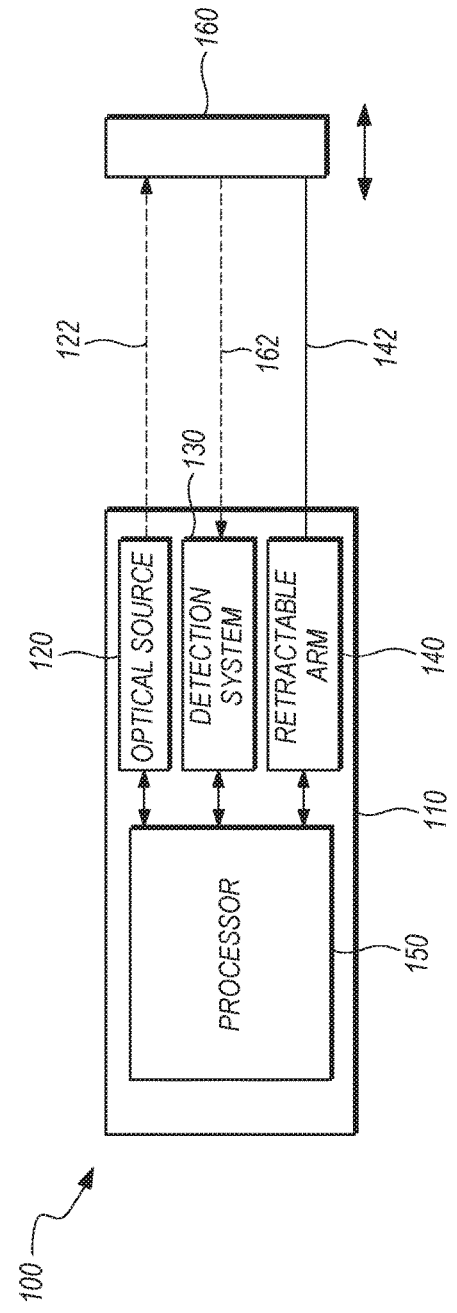

WAVELENGTH OPTIMIZATION FOR FREE-SPACE OPTICAL COMMUNICATIONS

CROSS-REFERENCE TO RELATED APPLICATIONS

This application claims the benefit of U.S. Provisional Patent Application Ser. No. 62/198,223 filed Jul. 29, 2015, entitled "System and Method for Wavelength Optimization Via Retroreflection for Underwater Free-Space Optical Communication", the entire content of which is fully incorporated by reference herein.

FEDERALLY-SPONSORED RESEARCH AND DEVELOPMENT

Wavelength Optimization for Underwater Free-Space Optical Communications is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac T2@navy.mil; reference Navy Case Number 102562.

BACKGROUND

Wirelessly transmitting large volumes of information at high data rates in certain environments, such as underwater, is becoming increasingly important for applications such as environmental monitoring and petroleum exploration and maintenance. As an example, interest in optical communication between undersea assets has increased because such optical communications can, at short ranges (10 m-100 m), provide much higher data rates than acoustic communications. The blue-green spectrum is used because seawater exhibits maximal transmission in this region, but local water conditions can vary the ideal wavelength significantly. Clear ocean waters best transmit blue light sources (around 475 nm), while turbid coastal waters best transmit green light sources (around 550 nm).

If an asset is equipped with either of these configurations, but is used in different locations, large optical losses will be incurred or excessive power consumption may be required to compensate for increased signal error. A need exists for a system and method that can adapt to dynamic conditions within a desired operating environment to optimize the optical communication channel between equipment with reduced errors and high data rates.

BRIEF DESCRIPTION OF THE DRAWINGS

FIGS. 1 and 2 show block diagrams of embodiments of a system in accordance with the Wavelength Optimization for Underwater Free-Space Optical Communications.

DETAILED DESCRIPTION OF SOME EMBODIMENTS

Figure 3A:
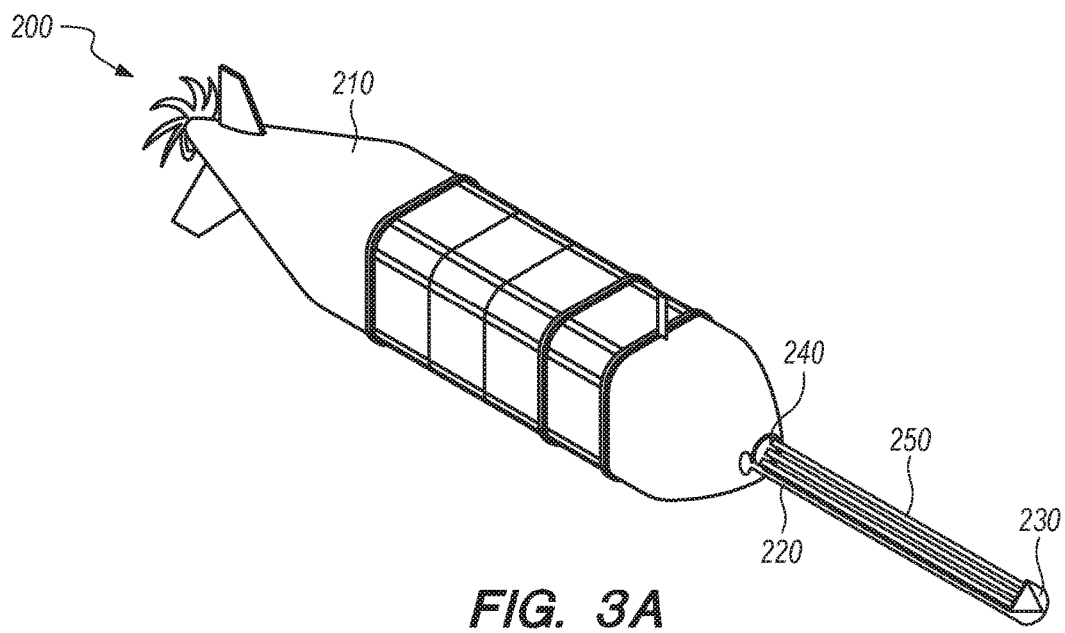
FIGS. 3A and 3B show diagrams illustrating the operation of an embodiment of a system in accordance with the Wavelength Optimization for Underwater Free-Space Optical Communications.

FIG. 1 shows a block diagram of an embodiment of a system 10 in accordance with the Wavelength Optimization for Underwater Free-Space Optical Communications. System 10 includes a platform 20 having an optical source 30 and a detection system 40 each connected to a processor 50. System 10 is configured to propagate, via optical source 30, optical signals 32 through a surrounding medium, such as air or water, towards a reflective surface 60.

In some embodiments, optical signals 32 are propagated from platform 20 sequentially, while in other embodiments, optical signals 32 are propagated from platform 20 in parallel. As an example, each different optical signal propagated, either sequentially or in parallel, may have a different wavelength or a wavelength in a different range. However, in other embodiments, one or more of the propagated signals may have the same wavelength or a wavelength within the same range as another propagated signal.

Platform 20 may comprise a stationary or moving object, may be disposed on a stationary or moving object, or may be otherwise connected to a stationary or moving object. Further, platform 20 may be land-based, surface-based, air-based, or may be located underwater. As an example, platform 20 may be an underwater vehicle, a stationary land platform, a moving land-based vehicle, or a moving air-based vehicle.

Optical source 30 may comprise one or more optical sources, such as LEDs, lasers, or other sources configured to propagate an optical signal as would be recognized by a person having ordinary skill in the art. In some embodiments, one optical source is used that is configured to propagate optical signals of varying wavelengths and/or wavelength ranges. In some embodiments, multiple optical sources 30 are used that are each configured to propagate a particular wavelength and/or wavelength range. The wavelength ranges propagated by optical source 30 may span the optical electromagnetic spectrum. As an example, the wavelength ranges may include the infrared, visible, and ultraviolet spectrums.

Detection system 40 is configured to detect reflected optical signals 62, which are the propagated optical signals 32 reflected off of reflective surface 60. Detection system 40 may comprise one or more photoelectric-based optical detectors, such as photoresistors, photomultiplier tubes, and photodiodes. In some embodiments, detection system 40 may comprise one detector that detects each of the reflected signals. In some embodiments, detection system 40 may comprise more than one detector to enable simultaneous detection of multiple reflected signals.

Figure 4:
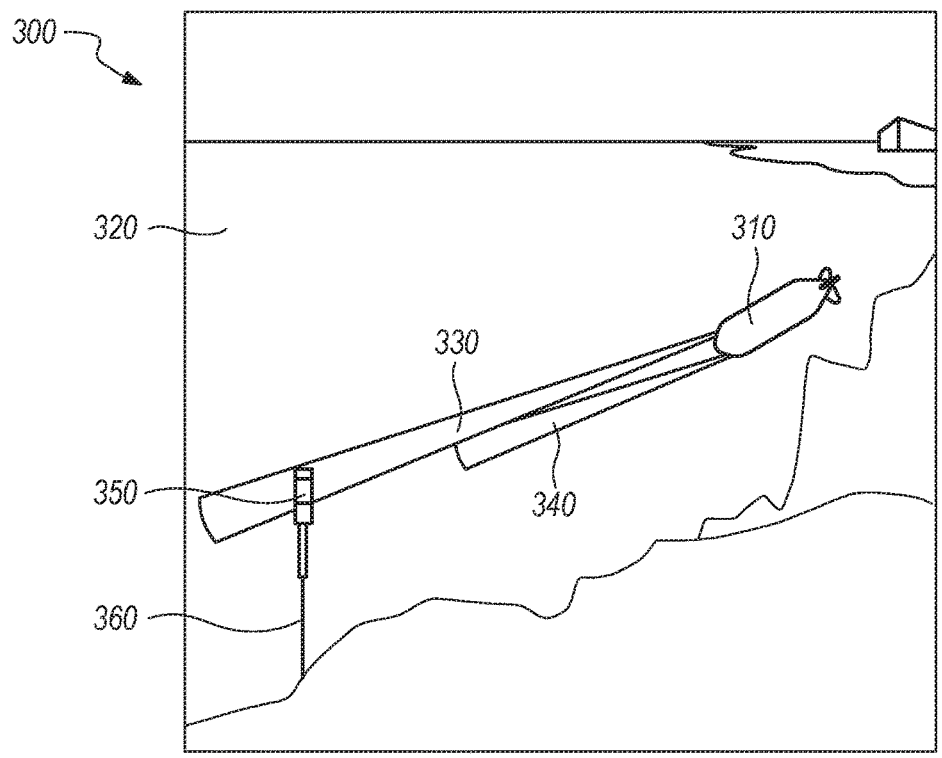
FIGS. 4 and 5 show diagrams of an embodiment of a system in accordance with the Wavelength Optimization for Underwater Free-Space Optical Communications operating in an underwater environment.
Figure 5:
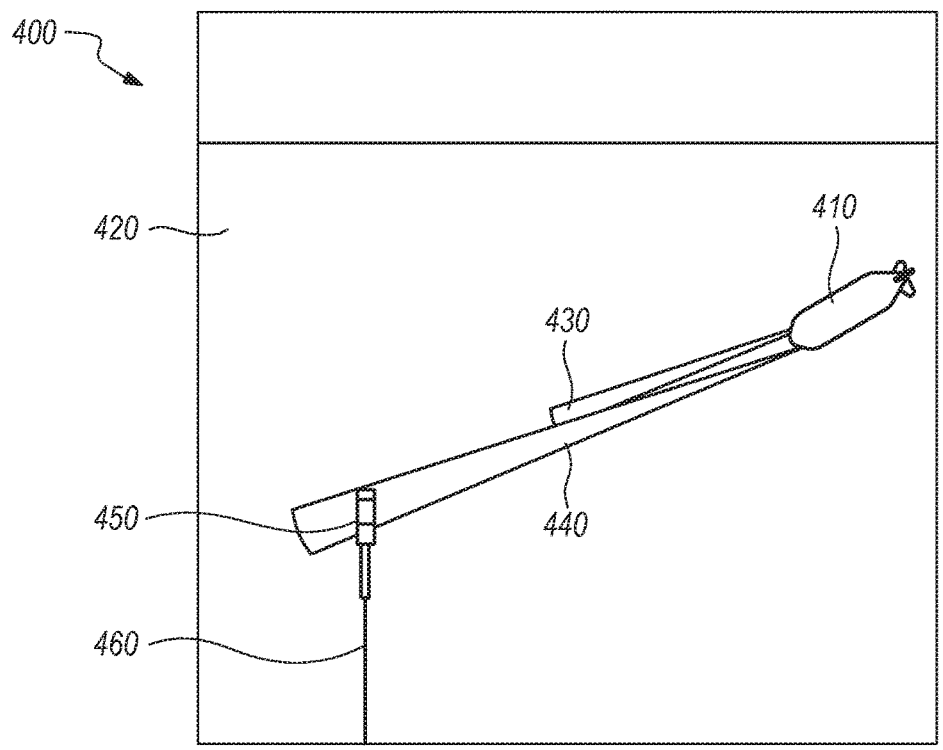

Reflective surface 60 may comprise any surface that is capable of reflecting an optical signal. As an example, reflective surface 60 may comprise a metallic or dielectric-film-stack mirror, or a retroreflector, such as a hollow corner-cube, solid corner-cube, or cat's eye retroreflector. In some embodiments, such as shown in FIGS. 1, 4, and 5, the reflective surface is located within the surrounding medium separate from platform 20. As an example, if platform 20 is an underwater vehicle, reflective surface 60 may be located on an underwater buoy or tethered underwater as shown in FIGS. 4 and 5.

In some embodiments, such as shown in FIG. 2, the reflective surface is integrated into the platform. FIG. 2 shows a diagram of a system 100 that includes a platform 110 having an optical source 120, a detection system 130, and a retractable arm sub-system 140 each connected to a processor 150. System 100 is configured to propagate, via optical source 120, optical signals 122 through a surrounding medium, such as air or water, towards a reflective surface 160, which is connected to an end of a retractable arm 142 that is connected to platform 110. Components of system 100 having the same name as components of system 10 may be configured the same as the components of system 10.

In operation, prior to system 100 propagating the optical signals 122, reflective surface 160 is extended via retractable arm 142 to a first distance from platform 110 into the surrounding medium. After extension of reflective surface 160, optical signals 122 are propagated towards and reflected off of reflective surface 160. The detected reflected signals 162 are then processed by processor 150. In some embodiments, reflective surface 160 is repositioned to a second distance, closer or further as shown by the arrow, from platform 110 and optical signal propagation and detection is again performed. If the surrounding medium is either highly transparent or highly opaque, extending retractable arm 142 to one given distance from platform 110 may not yield useful data within the detector's dynamic range. Thus, this process may repeat for various distances to provide varying data for calculations by processor 150.

Processors 50 and 150 may comprise any type of computational device having specific circuitry contained therein or specific software modules stored therein or accessible thereto that is configured to perform the functionality of processors 50 and 150 as described herein. As an example, processors 50 and 150 may comprise an FPGA processor, a microcontroller, or similar. Processors 50 and 150 are configured to receive respective reflected optical signals 62 and 162 from their respective detection system 40 and 130. Processors 50 and 150 are then configured to select an ideal optical wavelength for optical communication from their respective platform 20 and 110 within the surrounding medium based upon one or more characteristics of the respective detected reflected optical signals 62 and 162.

In some embodiments, the ideal optical wavelength for optical communication from platforms 20 and 110 is determined based upon a calculated power loss per wavelength. The calculation is summarized as follows. First, to properly calibrate, the system detects the output power of the optical source by one of several methods. These methods may include using an integrated optical detector internal to optical source 120, or bringing reflector 160 in close proximity to optical source 120/detection system 130 for the purpose of negating the attenuation effect of the surrounding medium, and then permitting the detection of the reflected power. This "reference" value, which is not expected to significantly fluctuate with respect to the transmitted signal, is collected for each unique wavelength, and is called X. Second, light is transmitted through the medium and is partially attenuated at each wavelength; the collected result is called the "signal" value Y. Finally, a "correction" value C is determined that normalizes the ratio of Y/X; when the system is operational in any non-attenuating environment, such as the vacuum of space, the value C corrects the processor such that a transmission ratio of 1.0 is found at each wavelength. Therefore, the transmitted power T is calculated as $T=(Y*C/X)$.

In some embodiments, the ideal optical wavelength is determined using backscatter data in addition to the calculated power loss per wavelength. In such embodiments, no reflector is used, and the system analyzes the light intensity backscattering from the medium. Minimal backscatter indicates a minimal concentration of scatter-inducing particulate matter, a condition ideal for optical transmission. In some embodiments, the ideal optical wavelength for optical communication from platforms 20 and 110 may be determined based upon other characteristics of the detected reflected signals.

After the calculations have been performed and an ideal wavelength for communication has been selected, platforms 20 and 110 may save the data from the spectroscopic characterization of the environment for future use and documentation, and then commence communication within the surrounding medium by propagating an optical signal having the selected ideal optical wavelength. In embodiments where reflective surface 160 is connected to retractable arm 142, prior to communication, retractable arm 142 is retracted into platform 110 to ensure that reflective surface 160 does not block the optical communication path from optical source 120.

In some embodiments, prior to propagating the optical signals, for wavelength determination purposes and/or for communication, one or more anti-biofouling operations are performed on optical sources 30 and 120. As an example, the anti-biofouling operations include the use of chemical coatings, the use of physical wipers configured to mechanically clean optical surfaces, and/or the use of ultraviolet light which is located within the optical source assembly 120 or elsewhere nearby.

Figure 3B:
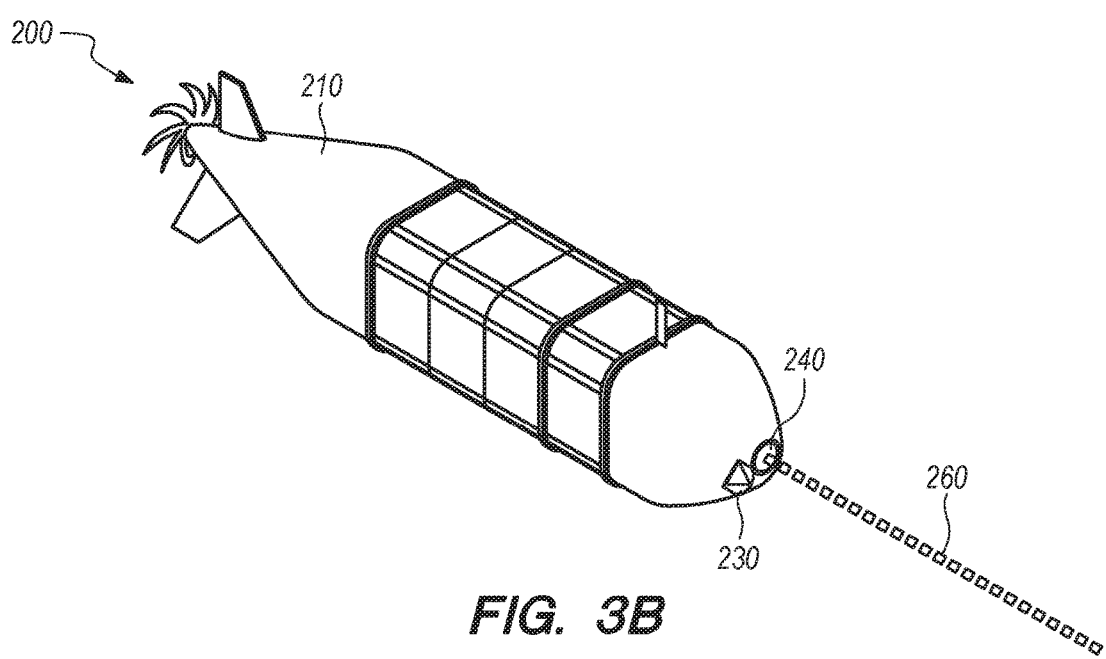

FIGS. 3A and 3B show diagrams illustrating the operation of an embodiment of a system 200 in accordance with the Wavelength Optimization for Underwater Free-Space Optical Communications. As shown, system 200 is an underwater vehicle having a body 210, a retractable arm 220 coupled thereto with a reflective surface 230 connected to an end of retractable arm 220. FIG. 3A illustrates a diagram showing the propagation of optical signals and receipt of reflected optical signals as part of the optimal wavelength determination process. As shown in FIG. 3A, retractable arm 220 is extended from body 210. An optical source located in region 240 at the front of body 210 is propagating optical signals 250 towards reflective surface 230. Optical signals are reflected off of reflective surface 230 and are detected by a detection system adjacent to the optical source in region 240. As an example, the optical source and detection system may have a physical configuration similar to that shown in FIG. 6.

FIG. 3B shows a diagram illustrating the propagation from system 200 of an optical signal using the selected ideal optical wavelength. As shown in FIG. 3B, retractable arm 220 is fully retracted within body 210 such that reflective surface 230 is out of the optical signal path from the optical source. The optical source propagates a signal 260, for communication or other means such as light detection and ranging (LIDAR), using the ideal optical wavelength.

FIGS. 4 and 5 show diagrams 300 and 400 of an embodiment of a system in accordance with the Wavelength Optimization for Underwater Free-Space Optical Communications operating in an underwater environment. As shown in diagram 300 in FIG. 4, system 310 is located in an underwater environment 320 where the water is turbid. As an example, system 310 is configured as shown in FIGS. 3A and 3B. An optical source on system 310 propagates an optical signal 330 having a first wavelength and an optical signal 340 having a second wavelength. As an example, the first wavelength is in the green spectrum, typically between 495 nm and 570 nm, while the second wavelength is in the blue spectrum, typically between 450 nm and 495 nm. As shown, optical signal 330 propagates further in turbid water than optical signal 340, allowing optical signal 330 to reach a reflective surface 350 coupled to a tether 360 in underwater environment 320.

FIG. 5 shows the opposite situation. As shown in diagram 400 in FIG. 5, system 410 is located in an underwater environment 420 where the water is clear. As an example, system 410 is configured as shown in FIGS. 3A and 3B. An optical source on system 410 propagates an optical signal 430 having a first wavelength and an optical signal 440 having a second wavelength. As an example, the first wavelength is in the green spectrum while the second wavelength is in the blue spectrum. As shown, optical signal 440 propagates further in clear water than optical signal 430, allowing optical signal 440 to reach a reflective surface 450 coupled to a tether 460 in underwater environment 420.

Figure 6:
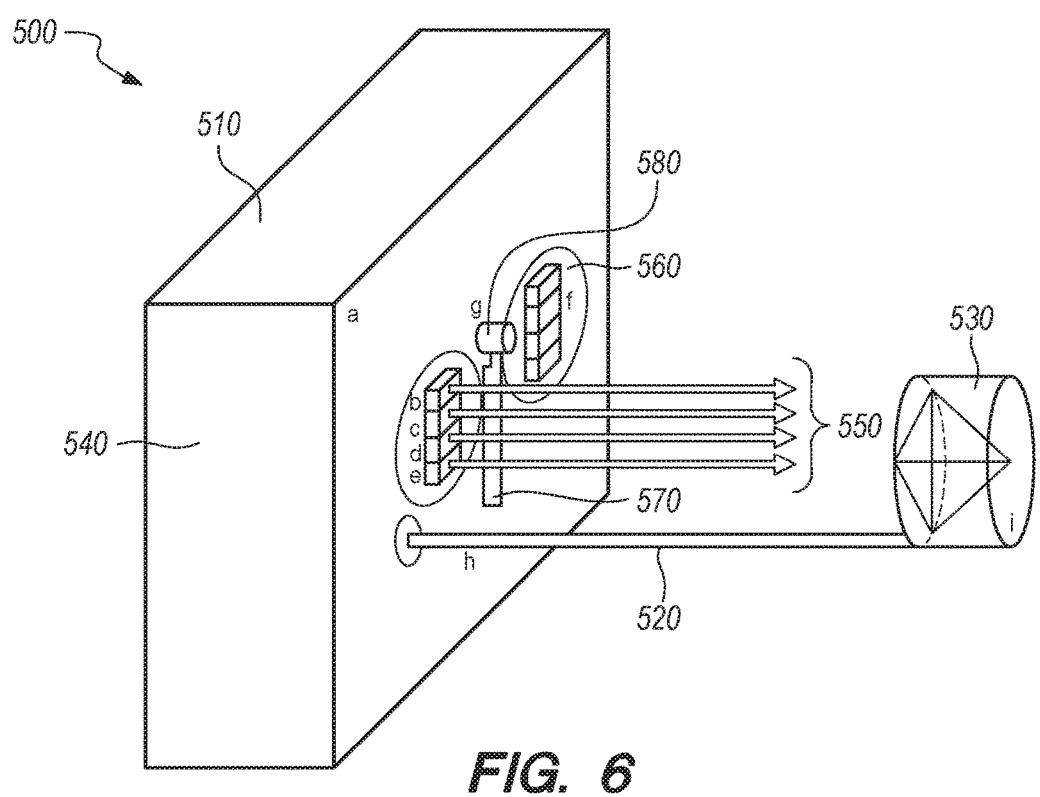
FIG. 6 shows a diagram illustrating the optical and anti-biofouling components of an embodiment of a system in accordance with the Wavelength Optimization for Underwater Free-Space Optical Communications.

FIG. 6 shows a diagram 500 illustrating the optical and anti-biofouling components of an embodiment of a system in accordance with the Wavelength Optimization for Underwater Free-Space Optical Communications. As shown, a system has a body 510 including a retractable arm 520 connected thereto. One end of retractable arm 520 has a reflective surface 530, such as a retroreflector, secured to an end thereof. A plurality of optical sources 540 integrated into body 510 are configured to propagate a plurality of optical signals 550, each having a different wavelength, towards reflective surface 530. The reflected optical signals (not shown) are then detected by detection system 560, which may comprise a plurality of optical detectors. A mechanical wiper 570 is secured to body 510 by wiper motor housing 580 and is configured to clean optical sources 540 and optical detectors 560.

Figure 7A:
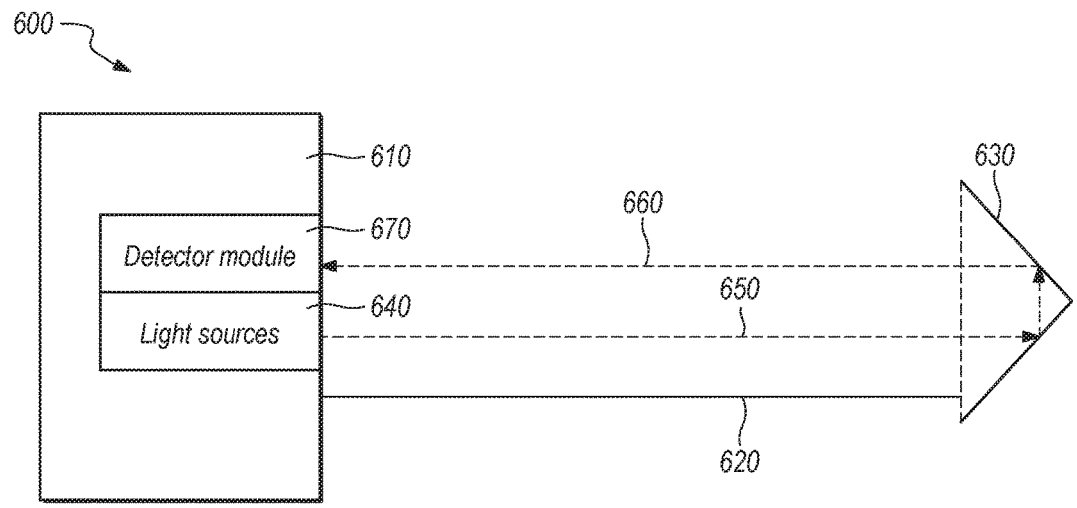
FIG. 7A shows a block diagram illustrating the optical path of a signal within a system using a corner cube retroreflector in accordance with the Wavelength Optimization for Underwater Free-Space Optical Communications.
Figure 7B:
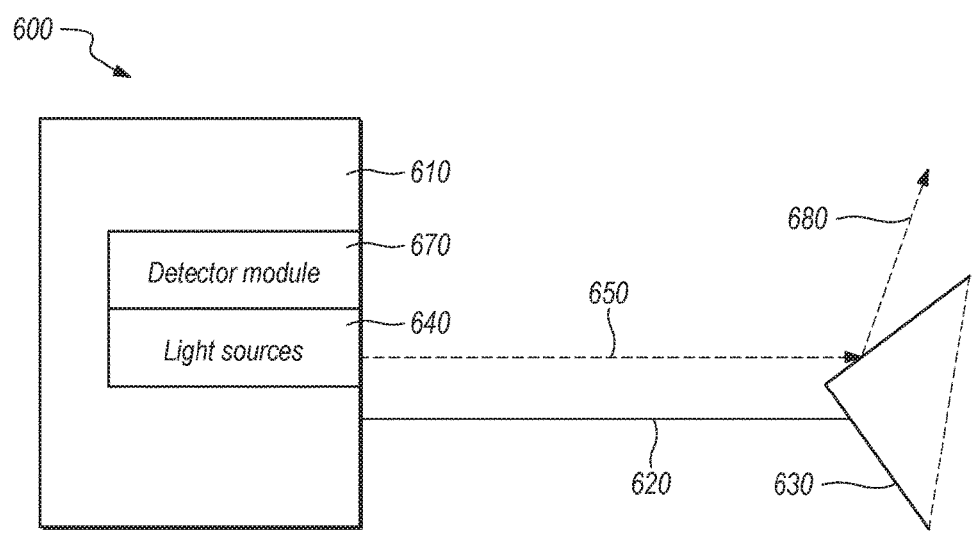
FIG. 7B shows a block diagram illustrating the optical path of the reflection of a signal off of the backside of a corner cube retroreflector in accordance with the Wavelength Optimization for Underwater Free-Space Optical Communications.

FIGS. 7A and 7B show block diagrams 600 illustrating the optical path of a signal within a system using a corner cube retroreflector in accordance with the Wavelength Optimization for Underwater Free-Space Optical Communications. FIG. 7A shows the optical path when the optical signal interacts with the front part of the retroreflector, while FIG. 7B shows a diagram illustrating the optical path of the reflection off of the backside of the retroreflector. A platform 610 has a retractable arm 620 connected thereto having a corner cube retroreflector 630 coupled to an end thereof. Optical source 640 propagates an optical signal 650 towards retroreflector 630. As shown in FIG. 7A, optical signal 650 reflects off of retroreflector 630 and reflected signal 660 is directed back towards platform 610 to, and is detected by, detector 670.

As shown in FIG. 7B, retroreflector 630, or a similar reflector, which may be connected to retractable arm 620 using a gimbal mount, is re-oriented, such as in response to a signal from a processor (not shown) within platform 610, such that the backside of retroreflector 630 is facing towards platform 610. Accordingly, optical signal 650 reflects off of the back surface of retroreflector 630. The reflected signal 680 does not reflect back towards platform 610, but rather reflects into the surrounding medium. The setup shown in FIG. 7B may be used to direct optical signals in a particular direction for such purposes of communication, spectroscopy, or LIDAR.

Figure 8A:
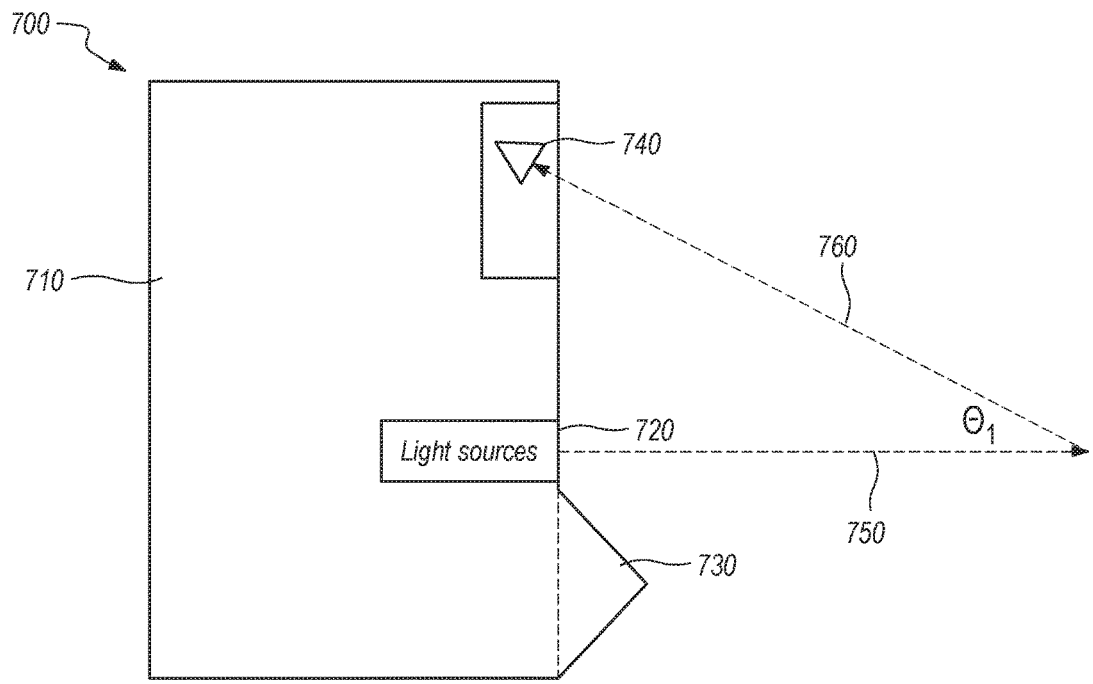
FIGS. 8A and 8B show block diagrams illustrating the optical path of backscatter data collected by a system at different angles in accordance with the Wavelength Optimization for Underwater Free-Space Optical Communications.
Figure 8B:
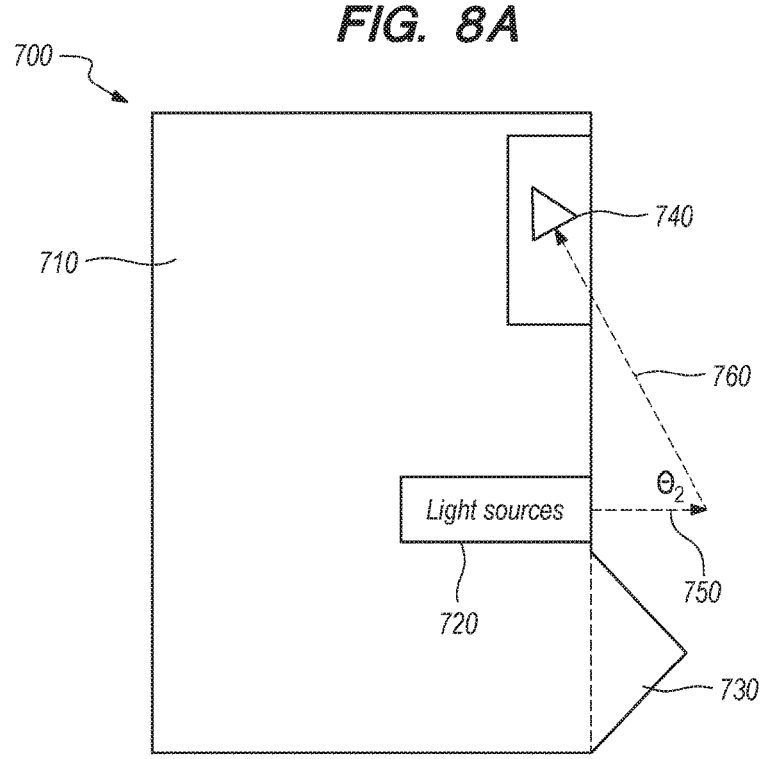

FIGS. 8A and 8B show block diagrams 700 illustrating the optical path of backscatter data collected by a system at different angles in accordance with the Wavelength Optimization for Underwater Free-Space Optical Communications. Diagrams 700 show a platform 710 having an optical source 720, a reflective surface 730, and an optical detector 740, with reflective surface 730 stowed out of the path of optical signal 750. Optical source 720 is configured to propagate an optical signal 750 into a surrounding medium. Optical signal 750 is not reflected by reflective surface 730, but rather creates a backscatter signal 760 from the surrounding medium that is detected by optical detector 740. The backscattering angle is determined by the angle at which optical detector 740 is aligned. As shown in FIG. 8A, the backscatter angle $\theta_1$ is small, while as shown in FIG. 8B, the backscatter angle $\theta_2$ is larger. A system that can adjust the backscatter viewing angle can be used to analyze the angle-dependent scattering properties of various particulate materials.

Figure 9:
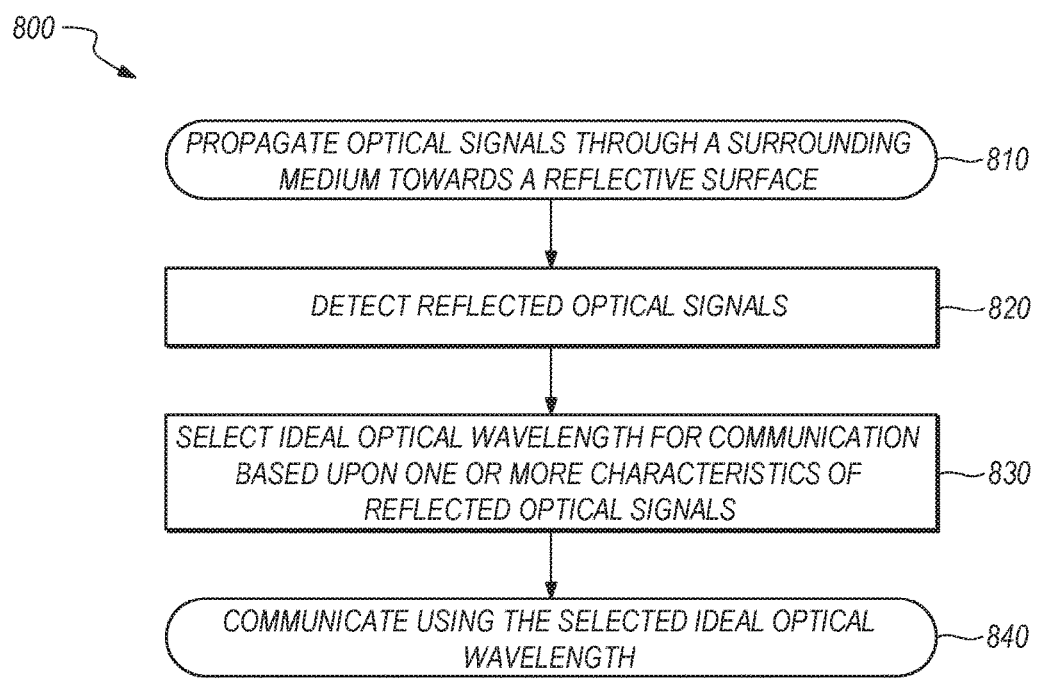
FIGS. 9 and 10 show flowcharts of embodiments of a method in accordance with the Wavelength Optimization for Underwater Free-Space Optical Communications.

FIG. 9 shows a flowchart of an embodiment of a method 800 in accordance with the Wavelength Optimization for Underwater Free-Space Optical Communications. Method 800 may be performed by any of the systems disclosed herein. As an example, method 800 will be discussed with reference to system 100 as shown in FIG. 2. Further, while FIG. 9 shows one embodiment of method 800 to include steps 810-840, other embodiments of method 800 may contain fewer or more steps. Further, while in some embodiments the steps of method 800 may be performed as shown in FIG. 9, in other embodiments the steps may be performed in a different order, or certain steps may occur simultaneously with one or more other steps.

Method 800 may begin with step 810, which involves propagating, from optical source 120 connected to platform 110, more than one optical signal 122 through a surrounding medium towards a reflective surface 160. Step 820 involves detecting reflected optical signals 162 using a detection system 130 coupled to platform 110, wherein reflected optical signals 162 are the propagated optical signals 122 reflected off of reflective surface 160. Step 830 involves selecting, using processor 150, an ideal optical wavelength for optical communication, or other means, from platform 110 within the surrounding medium based upon one or more characteristics of detected reflected optical signals 162. Step 840 involves propagating an optical signal from the platform into the surrounding medium, such as shown in FIG. 3B, using the selected ideal optical wavelength.

Figure 10:
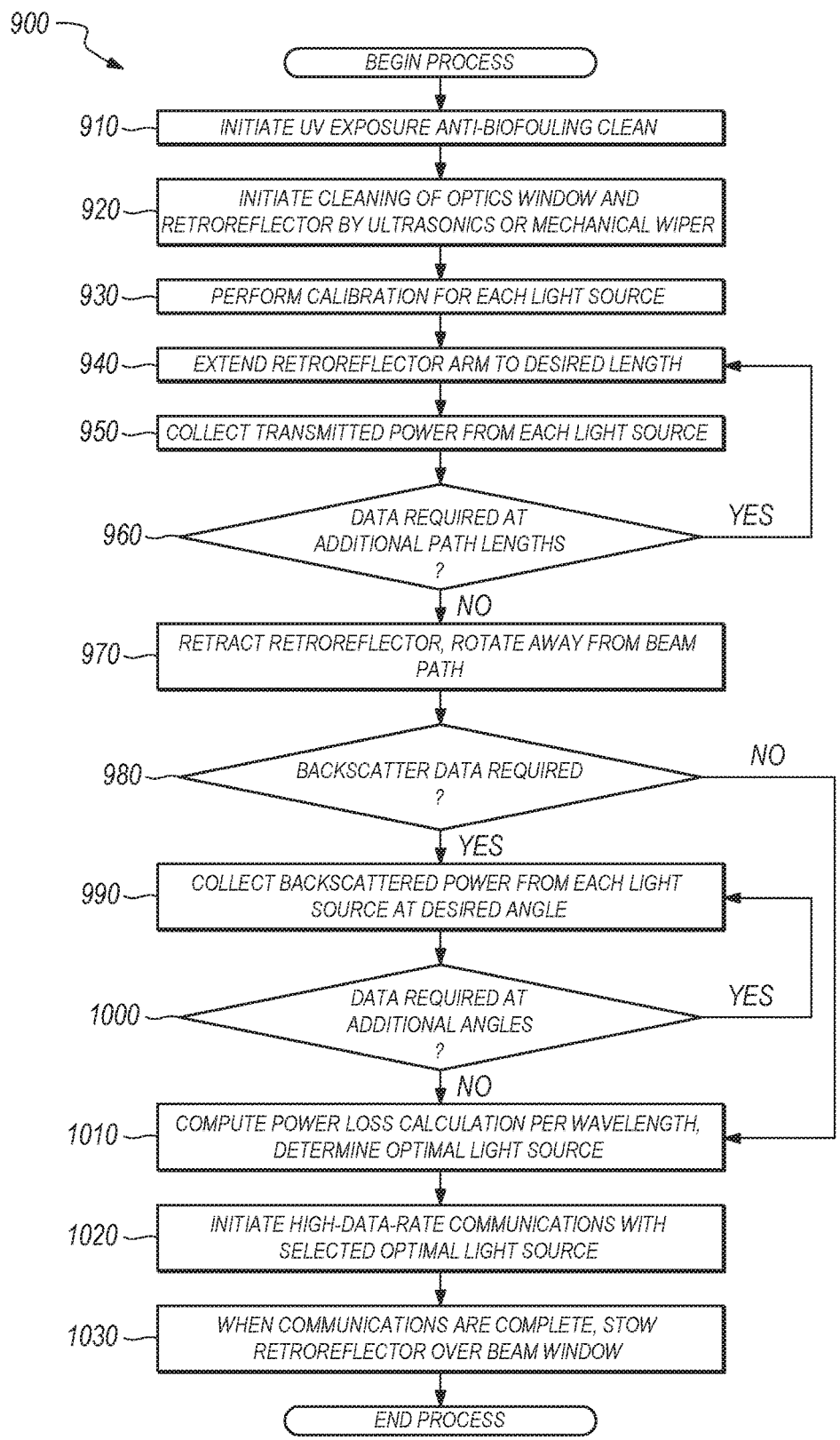

FIG. 10 shows a flowchart of an embodiment of a method 900 in accordance with the Wavelength Optimization for Underwater Free-Space Optical Communications. Method 900 may be performed by any of the systems disclosed herein. As an example, method 900 will be discussed with reference to system 100 and 500 as shown in FIGS. 2 and 6. Further, while FIG. 10 shows one embodiment of method 900 to include steps 910-1030, other embodiments of method 900 may contain fewer or more steps. Further, while in some embodiments the steps of method 900 may be performed as shown in FIG. 10, in other embodiments the steps may be performed in a different order, or certain steps may occur simultaneously with one or more other steps.

Method 900 may begin with step 910, which involves initiating an anti-biofouling cleaning operation on the windows of the optical source 540 and the optical detector 560 using ultraviolet exposure from a UV source located within or near optical source 540 by exposing the UV light to the system for a prescribed duration. Step 920 involves cleaning the window of the optical detector and the optical source using ultrasonic sound or a mechanical wiper 570. Step 930 involves calibrating each optical source 540 as described above. Step 940 involves extending the retroreflector arm 520 to a desired length. Step 950 involves collecting transmitted power from each optical source 540.

Step 960 involves determining, using processor 150, if data is required at additional path lengths. More paths are required if the attenuation is too low for a given arm length, because low discrimination between wavelengths would otherwise result. More paths are also required if the attenuation is too high for a given arm length, because a dropped signal outside of the detector's dynamic range would otherwise result. If these additional path lengths are required, method 900 then proceeds back to step 940 to extend the retroreflector arm 520 to a different length and steps 950 and 960 repeat. If additional path length data is not required, method 900 then proceeds to step 970.

Step 970 involves retracting the retroreflector arm 520 back into the platform 510 and rotating the retroreflector 530 away from the optical beam path from the optical source 540, as shown in FIGS. 3B, 8A, and 8B. Step 980 then involves a determination whether collection of backscatter data is required, which has been preprogrammed by the operator, or has been determined by processor 150 as necessary because, in its current state, a transmission measurement alone is insufficient to fully characterize the surrounding medium. If so, step 990 involves collection of backscatter power from each optical source 740 at a desired angle, as shown in FIG. 8A. Step 1000 then involves a determination similar to that of step 980 as to whether backscatter data from additional angles is required. If so, step 990 repeats at a different angle, as shown in FIG. 8B. If not, method 900 proceeds to step 1010. If the determination was made at step 980 that additional backscatter data was not required, method 900 also proceeds to step 1010.

Step 1010 involves calculation, using processor 150, of the power loss per wavelength for the reflected optical signals and determining the optimal optical wavelength for communication or for other means as discussed above. Step 1020 then involves initiation of optical communications using the selected optimal wavelength, as shown in FIG. 3B. Step 1030 then involves, when communications are complete, stowing the retroreflector over the window of the optical source to help prevent biofouling and/or damage to the optical source from the surrounding environment.

Methods 800 and 900 may be implemented as a series of modules, either functioning alone or in concert, with physical electronic and computer hardware devices. Methods 800 and 900 may be computer-implemented as a program product comprising a plurality of such modules, which may be displayed for a user. Methods 800 and 900 may be implemented on a digital signal processor (DSP) or a field programmable gate array (FPGA), a stand-alone microelectronic chip, or a combination of them.

Various storage media, such as magnetic computer disks, optical disks, and electronic memories, as well as non-transitory computer-readable storage media and computer program products, can be prepared that can contain information that can direct a device, such as a microcontroller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Wavelength Optimization for Underwater Free-Space Optical Communications are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
    propagating, from one or more optical sources connected to a platform, more than one optical signals through a surrounding medium towards a reflective surface, wherein the more than one optical signals each have a different wavelength;
    detecting reflected optical signals using a detection system coupled to the platform, wherein the reflected optical signals are the propagated optical signals reflected off of the reflective surface;
    calculating a power loss per wavelength for each of the detected reflected optical signals; and
    selecting an ideal optical wavelength for optical communication from the platform within the surrounding medium based upon the calculated power loss per wavelength of the detected reflected optical signals.

2. The method of claim 1, wherein the reflective surface is coupled to a retractable arm connected to the platform, the method further comprising the step of, prior to propagating the optical signals, extending the reflective surface to a first distance from the platform into the surrounding medium.

3. The method of claim 2 further comprising the steps of:
    retracting the reflective surface; and
    propagating an optical signal from the platform into the surrounding medium using the selected ideal optical wavelength.

4. The method of claim 1, wherein the reflective surface is located on a system located within the surrounding medium separate from the platform.

5. The method of claim 1 further comprising the step of, prior to selecting an ideal optical wavelength, collecting backscatter data to further characterize the surrounding medium, wherein the step of selecting an ideal optical wavelength for optical communication from the vehicle includes selecting the ideal optical wavelength based upon the calculated power loss per wavelength of the detected reflected optical signals and the collected backscatter data.

6. The method of claim 1, wherein the platform is a vehicle.

7. The method of claim 1 further comprising the step of, prior to propagating the optical signals, performing one or more anti-biofouling operations on the optical source.

8. The method of claim 7, wherein the anti-biofouling operations consist of one or more of the use of chemical coatings, the use of physical wipers configured to mechanically clean optical surfaces, and the use of ultraviolet light.

9. The method of claim 1, wherein the optical signals are propagated from the vehicle sequentially and the detection system comprises one detector.

10. The method of claim 1, wherein the optical signals are propagated from the vehicle in parallel and the detection system comprises more than one detector.

11. A method comprising the steps of:
extending a retroreflector to a first distance from a vehicle into a surrounding environment;
propagating more than one optical signals from the vehicle through the surrounding environment towards the retroreflector, wherein each of the propagated optical signals comprises a different wavelength;
detecting reflected optical signals using a detector coupled to the vehicle, wherein the reflected optical signals are the propagated optical signals reflected off of the retroreflector;
calculating a power loss per wavelength for each of the detected reflected optical signals; and
selecting an ideal optical wavelength for optical communication from the vehicle within the surrounding environment based upon the calculated power loss per wavelength of the detected reflected optical signals.

12. The method of claim 11 further comprising the steps of:
determining that data is required at one or more additional distances;
sequentially extending the retroreflector the additional distances;
for each of the distances, propagating more than one additional optical signals from the vehicle towards the retroreflector;
for each of the distances, detecting additional reflected optical signals using a detector module coupled to the vehicle, wherein the additional reflected optical signals are the propagated additional optical signals reflected off of the retroreflector;
calculating a power loss per wavelength for each of the detected additional reflected optical signals; and
selecting an ideal optical wavelength for optical communication based upon the calculated power loss per wavelength of the combined detected reflected optical signals and the detected additional reflected optical signals.

13. The method of claim 11 further comprising the step of transmitting an optical signal from the vehicle into the surrounding environment using the selected ideal optical wavelength.

14. The method of claim 11 further comprising the step of, prior to propagating the optical signals, performing one or more anti-biofouling operations on the optical source.

15. The method of claim 11, wherein the optical signals are propagated from the vehicle in one of sequential propagation and parallel propagation.

16. A system comprising:
a vehicle comprising an optical source, detector module, and processor, wherein the optical source is separated by a distance from a reflective surface, the optical source configured to propagate more than one optical signals each having a different wavelength through a surrounding environment towards the reflective surface, wherein the detector module is configured to detect reflected optical signals from the reflective surface, wherein the reflected optical signals are the propagated optical signals reflected off of the reflective surface, wherein the processor is configured to calculate a power loss per wavelength for each of the detected reflected optical signals and select an ideal optical wavelength for optical communication from the vehicle within the surrounding environment based upon the calculated power loss per wavelength of the detected reflected optical signals.

17. The system of claim 16, wherein the reflective surface is coupled to a retractable arm connected to the vehicle.

18. The system of claim 16, wherein the reflective surface is a retroreflector.

* * * * *